Dec. 20, 1938.  A. PARANZINO  2,140,968
AUTOMOBILE BODY
Filed Oct. 15, 1937
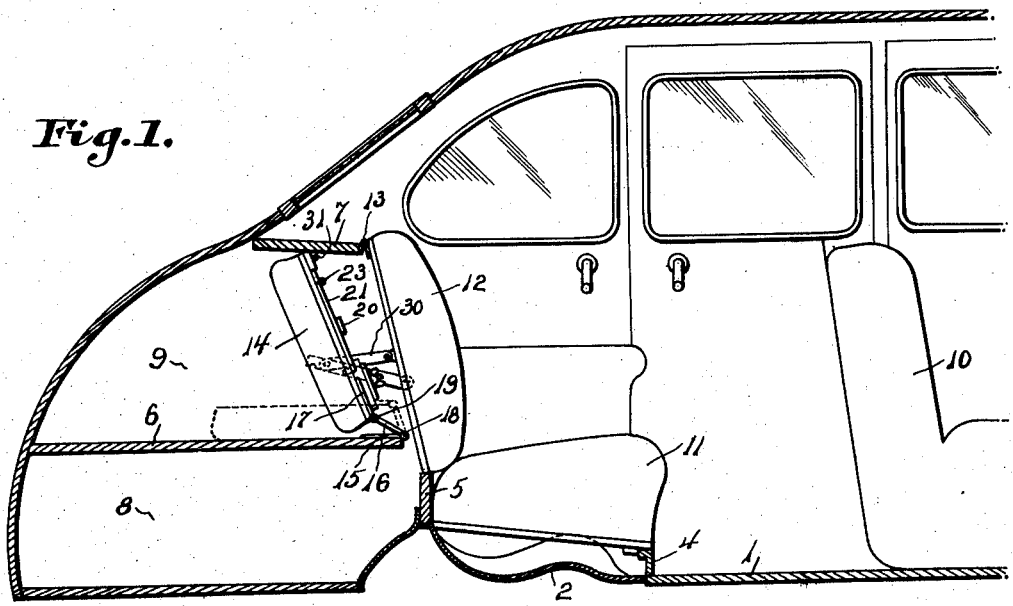
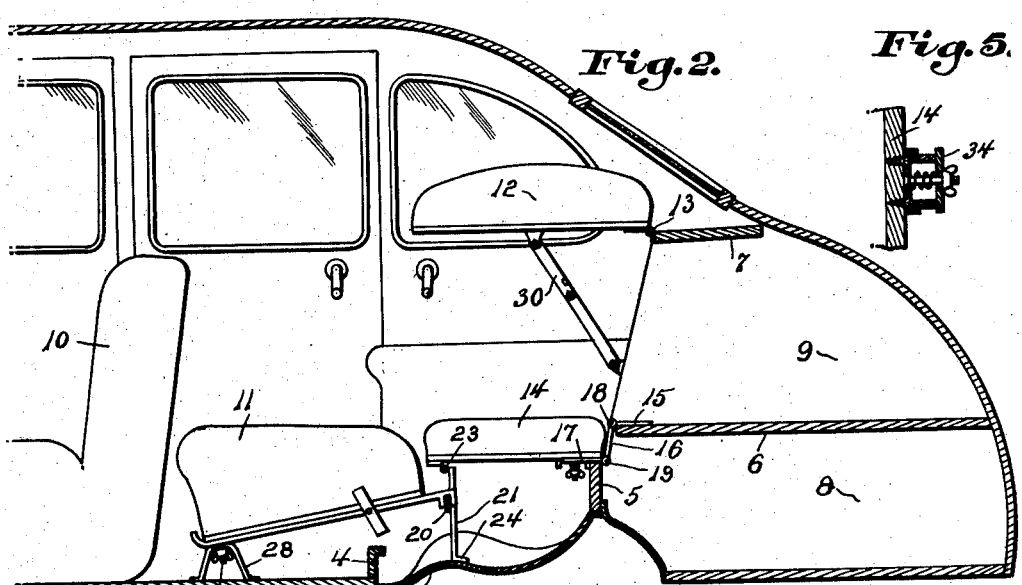
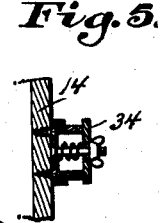
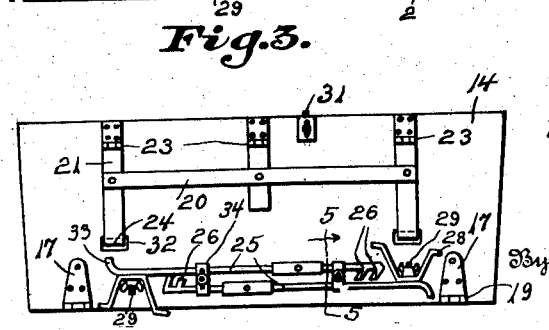
Inventor
Anthony Paranzino
Albert E Dieterich
and
By Theodore H. Rutley
Attorneys Patented Dec. 20, 1938

2,140,968

UNITED STATES PATENT OFFICE 2,140,968

AUTOMOBILE BODY

Anthony Paranzino, Moosup, Conn.

Application October 15, 1937, Serial No. 169,282

10 Claims. (Cl. 296—24)

My invention relates to certain new and useful improvements in the bodies of automobiles whereby the rear portion, i. e., that portion behind the driver's seat, may be converted into a sleeping compartment.

Certain types of automobiles of the present date have relatively large luggage compartments at the rear, access to which may be had by lifting up or removing the back seat cushion. It is an object of my invention to take advantage of this construction in providing means to convert the rear compartment into a sleeping compartment without in the slightest marring the upholstery of the car or the furnishings thereof, or changing the construction of the cushions or other parts of the body.

The modern car, for which my invention has been designed, usually has a floor that is not flat throughout; the rear seat cushion is raised slightly, or not at all, above the floor and such cushion is usually wedge-shape; my invention therefore has for a further object to provide means whereby these wedge-shape rear seat cushions may be used as a part of the bed structure and may be supported with their upper face horizontal.

Again, it is an object to provide an auxiliary cushion and means to support it with its top face in a plane with that of the seat cushion, and to support both of these cushions on a level with the floor of the luggage compartment of the vehicle, the auxiliary cushion being arranged for storage in the luggage compartment when not in use.

Other objects will in part be obvious and in part be pointed out hereinafter.

To the attainment of the aforesaid objects and ends, the invention still further resides in the novel details of construction, combination and arrangement of parts, all of which will be first fully described in the following detailed description, and then be particularly pointed out in the appended claims, reference being had to the accompanying drawing, in which:—

Fig. 1 is a vertical section of a portion of an automobile body with the parts in position for ordinary daytime driving.

Fig. 2 is a similar view with the parts positioned to form a bed.

Fig. 3 is an inverted plan view of the auxiliary cushion.

Fig. 4 is a detail perspective view of one of the rear-seat-cushion supporting bars and its removable leg.

Fig. 5 is a detail section on the line 5—5 of Fig. 3.

In the drawing 1 represents the floor of the car body which, in present-day machines, has an irregularly raised portion 2 to clear the differential, 4 designates the front cross support for the rear seat cushion 11 when in ordinary use, 5 indicates the wall between the tire compartment 8 and the rear seat of the car, 6 indicates the floor of the luggage compartment 9, 7 indicates the shelf in back of the back cushion of the rear seat, and 10 indicates the front seat. All of the foregoing parts are of present-day construction and do not, per se, constitute a part of my invention.

In carrying out my invention, in cars in which the back cushion of the rear seat is not hinged at the top, I provide hinges 13 to connect the cushion 12 to the shelf 7 so it may be swung to a horizontal position, where it may be held in position by a suitable brace 30.

I further provide an auxiliary cushion 14 of a size to occupy the space between the cushion 11 and the front end of the floor 6 when the bed is made up. This cushion 14 is hinged to the floor 6 by three-leaf hinges, the leaves 15—16 being hingedly connected at 18 and the leaves 16—17 being hingedly connected at 19. The leaf 15 of each hinge is secured to the floor 6, while the leaf 17 of each hinge is secured to the bottom of the cushion 14.

The cushion 14 may thus be swung into and from the luggage compartment 9. When in the luggage compartment it may lie flat, as shown in dotted lines in Fig. 1, or be held upright by means of a bolt 31, as shown in full lines in Fig. 1.

On the under side of the cushion 14 is hingedly secured at 23 a support consisting of uprights 21, 22, connected by a cross bar 20. The uprights may have foot portions 24 to rest on the floor 2, in which event the bottom of the cushion 14 will have recesses 32 to receive the foot portions when the support is folded flat against the bottom of the cushion.

When made up into a bed, the rear seat cushion 11 is supported on two flat bars 25 having fingers 26 at one end to take hold over the bar 20, and having removable legs 28 held by clamp screws 29. (or by other suitable means). The bars 25 may have upturned ends 33 to act as stops to hold the cushion 11 from slipping too far forward. Side stops 27 may also be provided.

When it is desired to adjust the parts for a bed, cushion 12 is raised and propped up; the seat cushion 11 is raised and the bars 25 are removed from beneath the seat 14 where they were stored (being held in place by clamps 34, see Figs. 3 and 5); cushion 14 is swung from the compartment 9 forwardly; the support 20—21, etc., is unfolded; and cushion 14 and the support are placed so that the back part of the cushion will rest on wall 5, while the front part is supported by 20—21, etc.

The bars 25 and legs 28 are assembled and the bars 25 are hooked over the cross bar 20. The cushion 11 is then placed, and the bed is ready for use. The bedding (not shown) is of course stored in the luggage compartment when not in use.

From the foregoing, taken in connection with the accompanying drawing, it is thought that the construction and advantages of the invention will be clear to those skilled in the art.

What I claim is:

1. In an automobile, a body having a floor, a rear seat cushion, a back cushion for the rear seat, a shelf in back of the back cushion, a luggage compartment back of the back cushion accessible from the front on lifting the back cushion, the luggage compartment having a stationary floor, combined with an auxiliary cushion, a hinge connection between said auxiliary cushion and said floor of the luggage compartment, whereby said auxiliary cushion may be swung from a position in the luggage compartment to a position in front of the same, a support for the front part of the auxiliary cushion when in its position for use, said support being attached to and carried by said auxiliary cushion and means for supporting the rear seat cushion in front of said auxiliary cushion, said supporting means being formed to support the auxiliary cushion and the rear seat cushion with their tops in substantially the same plane with the floor of said luggage compartment.

2. In an automobile, a body having a floor and being provided with a rear seating compartment, a luggage compartment to the rear of said rear seating compartment, a rear seat rest, a rear seat cushion normally located on said rest, a back cushion for the seat, said luggage compartment having a stationary floor at a higher level than that of the rear seat rest, means to support the rear seat cushion in front of the rear seat rest when desired, an auxiliary cushion hingedly mounted on a transverse axis to lie either over said rear seat rest or within said luggage compartment as desired, and means including an articulating member carried by said auxiliary cushion to rest on the floor of the body to support said auxiliary cushion over said rear seat rest when said rear seat cushion is pulled forwardly.

3. In an automobile, a body provided with a rear seating compartment, a luggage compartment to the rear of said rear seating compartment, a rear seat rest, a rear seat cushion normally located on said rest, a back cushion for the seat, said luggage compartment having a stationary floor at a higher level that of the rear seat rest, means to support the rear seat cushion in front of the rear seat rest when desired, an auxiliary cushion hingedly mounted on a transverse axis to lie either over said rear seat rest or within said luggage compartment as desired, and means including a leg hinged to said auxiliary cushion to support said auxiliary cushion over said rear seat rest when said rear seat cushion is pulled forwardly, said cushion-supporting means serving to hold the tops of said rear seat cushion and said auxiliary cushion substantially in a plane with the floor of said luggage compartment.

4. In an automobile, a body having a front seat and a rear seat, and a luggage compartment back of the rear seat, said rear seat comprising a rear seat cushion, a fixed floor support for said rear seat cushion, a back cushion, means hinging the top end of said back cushion on a horizontal axis so it may be swung up to an elevated horizontal position, and means to hold said back cushion up; in combination with an auxiliary cushion, means hingedly connecting said auxiliary cushion to the body so that it may be swung into and out of the luggage compartment when the back cushion is raised, a support hinged to the bottom of said auxiliary cushion to cooperate with said hinge-connection of said auxiliary cushion to support the cushion horizontally in front of the luggage compartment, and means cooperating with said hinged support for supporting the rear seat cushion in front of said auxiliary cushion whereby said rear seat cushion and said auxiliary cushion, together with the bottom of said luggage compartment, serve as a bed.

5. In an automobile having a body with a front seat, a rear seating compartment and a luggage compartment to the rear of the rear seating compartment, a rear seat comprising a back cushion and a seat cushion, a front cross support for the rear seat cushion, a transverse wall at the rear of the rear seat below the bottom of the luggage compartment, said back cushion being movable to gain entrance to said luggage compartment from the rear seating compartment, an auxiliary cushion hingedly mounted to be swung into and out of the luggage compartment when said back cushion is moved out of the way, a support for said auxiliary cushion when the same is swung forward, and means constructed to cooperate with said last named support to support said rear seat cushion to cooperate with said auxiliary cushion as a bed.

6. In an automobile having a body with a front seat, a rear seating compartment and a luggage compartment to the rear of the rear seating compartment, a rear seat comprising a back cushion and a seat cushion, a front cross support for the rear seat cushion, a transverse wall at the rear of the rear seat, said back cushion being movable to gain entrance to said luggage compartment from the rear seating compartment, an auxiliary cushion hingedly mounted to be swung into and out of the luggage compartment when said back cushion is moved out of the way, a support for said auxiliary cushion when the same is swung forward, and means constructed to cooperate with said last named support to support said rear seat cushion to cooperate with said auxiliary cushion as a bed.

7. In an automobile having a body with a front seat, a rear seating compartment and a luggage compartment to the rear of the rear seating compartment, a rear seat comprising a back cushion and a seat cushion, a front cross support for the rear seat cushion, a transverse wall at the rear of the rear seat, said back cushion being movable to gain entrance to said luggage compartment from the rear seating compartment, an auxiliary cushion hingedly mounted to be swung into and out of the luggage compartment when said back cushion is moved out of the way, a support for said auxiliary cushion when the same is swung forward, means constructed to cooperate with said last named support to support said rear seat cushion to cooperate with said auxiliary cushion as a bed, and means to hold said auxiliary cushion upright in the luggage compartment.

8. In an automobile having a body with a front seat, a rear seating compartment and a luggage compartment to the rear of the rear seating compartment, a rear seat comprising a back cushion and a seat cushion, a front cross support for the rear seat cushion, a transverse wall at the rear of the rear seat, said back cushion being movable to gain entrance to said luggage compartment from the rear seating compartment, an auxiliary cushion hingedly mounted to be swung into and out of the luggage compartment when said back cushion is moved out of the way, a support for said auxiliary cushion when the same is swung forward, and means to support said rear seat cushion to cooperate with said auxiliary cushion as a bed, said auxiliary cushion's support comprising a frame hinged to the bottom of the cushion and serving as a prop for the cushion.

9. In an automobile having a body with a front seat, a rear seating compartment and a luggage compartment to the rear of the rear seating compartment, a rear seat comprising a back cushion and a seat cushion, a front cross support for the rear seat cushion, a transverse wall at the rear of the rear seat, said back cushion being movable to gain entrance to said luggage compartment from the rear seating compartment, an auxiliary cushion hingedly mounted to be swung into and out of the luggage compartment when said back cushion is moved out of the way, a support for said auxiliary cushion when the same is swung forward, and means to support said rear seat cushion to cooperate with said auxiliary cushion as a bed, said auxiliary cushion's support comprising a frame hinged to the bottom of the cushion and serving as a prop for the cushion, and said rear seat cushion's support comprising bars with legs at the front end and fingers at the rear end to engage with and be supported by the auxiliary cushion's prop.

10. In convertible-body automobiles wherein the rear seat cushion and an auxiliary cushion are employed in forming a bed; an auxiliary cushion and means to support it and the rear seat cushion, said means comprising a frame hinged to the bottom of the auxiliary cushion adjacent its front edge and adapted to be folded under and against said bottom when not in use and to be extended at right angles to the bottom when in use, said frame including a cross bar and legs, a pair of supporting bars holding the rear seat cushion in place in front of the auxiliary cushion, said bars having means at one end to hook over said cross bar, legs attached to the other ends of said bars, and means to support said bars on the under side of said auxiliary cushion when not in use.

ANTHONY PARANZINO.